Sept. 18, 1923.
J. S. CURZON
HORSESHOE
Filed June 3, 1922
1,468,196
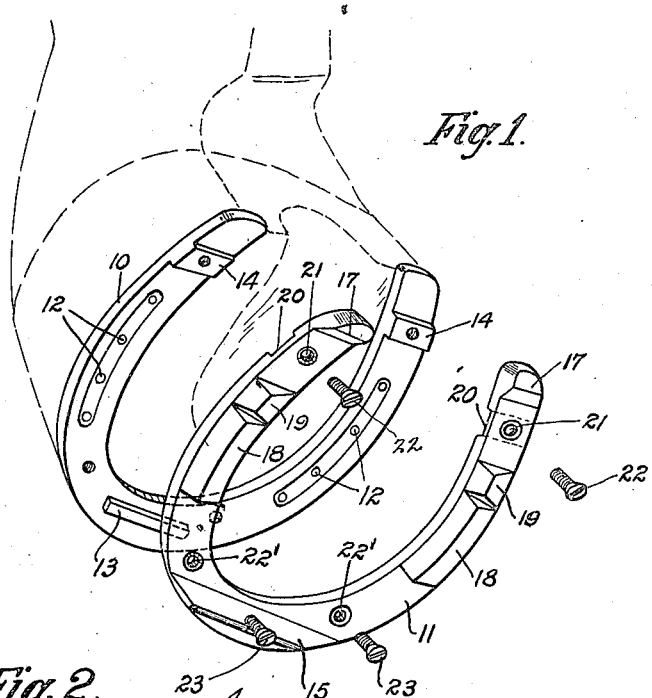
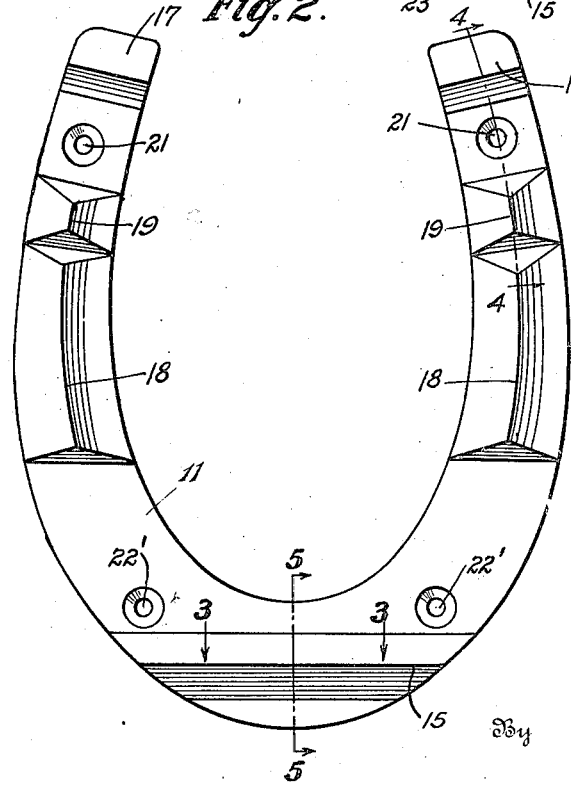
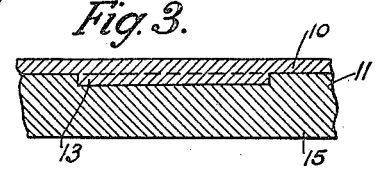
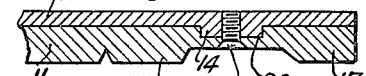
Inventor
J. S. Curzon.
By
Lacey & Lacey, Attorneys Patented Sept. 18, 1923.

1,468,196

UNITED STATES PATENT OFFICE.

JOHN S. CURZON, OF STORRS, UTAH.

HORSESHOE.

Application filed June 3, 1922. Serial No. 565,720.

*To all whom it may concern:*

Be it known that I, JOHN S. CURZON, a citizen of the United States, residing at Storrs, in the county of Carbon and State of Utah, have invented certain new and useful Improvements in Horseshoes, of which the following is a specification.

This invention relates to an improved horseshoe and seeks, as one of its principal objects, to provide a shoe wherein the wear surface of the shoe may be renewed without the necessity for detaching the shoe from a horse's hoof.

The invention has as a further object to provide a horseshoe which will be formed of coacting sections, one of which may be nailed to the horse's hoof while the other of said sections will be detachably connected to the first section so that, when worn out, the latter section may be detached and renewed.

And the invention has as a still further object to provide a horseshoe wherein the detachable section of the shoe may, if desired, be formed of rubber or otherwise cushioned to relieve pounding.

Other and incidental objects will appear hereinafter.

In the drawing:

Figure 1 is a perspective view of my improved horseshoe, showing the sections thereof detached;

Fig. 2 is an enlarged bottom plan view of the shoe;

Fig. 3 is a sectional view on the line 3—3 of Fig. 2;

Fig. 4 is a sectional view on the line 4—4 of Fig. 2; and

Fig. 5 is a sectional view on the line 5—5 of Fig. 2, looking in the direction of the arrows.

In carrying the invention into effect, I employ companion shoe sections 10 and 11 which are the counterpart of each other in general contour, the section 10 providing a top section and the section 11 a bottom section. The section 10 is provided with a plurality of openings 12 so that, as suggested in Fig. 1, said section may be nailed to a horse's hoof in the usual manner, and formed on the toe portion of the section is a transversely disposed calk 13 preferably rectangular in cross-section. Formed on the section near its ends are oblong transversely disposed heel calks 14 extending from edge to edge of the shoe and provided with flat lower faces, the heel calks being relatively wide.

Depending from the lower side of the section 11 of the shoe is a transversely disposed toe calk 15 extending clear across the toe portion of the section; and formed in the upper face of the section, opposite said calk, is a transversely disposed channel or recess 16. At its ends, the section 11 is further provided with transversely disposed heel calks 17 and, as best shown in Fig. 2, is preferably formed along its side portions with elongated V-shaped calks 18 at the rear ends of which are shorter V-shaped calks 19. As will be observed, the biting edges of said calks extend longitudinally of the section and are curved to conform to the contour thereof. Formed in the upper face of the section immediately in advance of the calks 17 are transversely disposed channels or recesses 20.

As will now be readily understood, the section 11 of the shoe may be arranged upon the section 10 lying flat thereagainst, when the calk 13 of the section 10 will fit in the recess 16 of the section 11, while the calks 14 of the former section will fit in the recesses 20 of the latter section. Formed in the ends of the section 11 are openings 21 for freely receiving cap screws 22 threaded into the calks 14 of the section 10, while near the ends of the calk 15 the section 11 is further provided with similar openings 22' for freely receiving cap screws 23 threaded into the toe portion of the section 10. Thus, the section 11 may be rigidly attached to the section 10 to receive the wear upon the shoe and when the section 11 is worn out, a new section may, as will be perceived, be readily substituted in lieu thereof. The section 10 is preferably of metal but the section 11 may be of metal or rubber or otherwise cushioned to relieve pounding. If so desired, the section 10 may be used without the section 11, when the calks 13 and 14 will serve, under ordinary circumstances, to prevent slipping. However, when rough weather is encountered, the section 11 may then be attached when the latter section will, by being equipped with sharp calks, provide sure footing. I accordingly provide a horseshoe of particularly efficient design and a shoe which may be renewed without the necessity for detaching the shoe from the horse's hoof.

Having thus described the invention, what is claimed as new is:

A horseshoe including a top section provided with a squared oblong toe calk and flat oblong heel calks, the toe calk extending transversely of the toe portion of the section and the heel calks extending from edge to edge of the portions of the section, a companion bottom shoe section fitting the top section and provided at its lower side with a V-shaped toe calk and with heel calks, the toe portion of the bottom section being formed at its upper side medially of said V-shaped calk with a recess snugly receiving the toe calk of the upper section and the heel portions of the lower section being formed at their upper sides with recesses snugly receiving the heel calks of the upper section, screws disposed near the ends of said V-shaped calk connecting the toe portions of the sections, and screws extending through the heel portions of the bottom section and threaded into the heel calks of the top section connecting the heel portions of the sections.

In testimony whereof I affix my signature.

JOHN S. CURZON. [L.S.]